(12) United States Patent
Knoodle

(10) Patent No.: US 9,104,507 B2
(45) Date of Patent: Aug. 11, 2015

(54) DEVELOPER PLATFORM

(76) Inventor: Daniel Knoodle, Irving, TX (US)

( * ) Notice: Subject to any disclaimer, the term of this patent is extended or adjusted under 35 U.S.C. 154(b) by 0 days.

(21) Appl. No.: 13/135,171

(22) Filed: Jun. 27, 2011

(65) Prior Publication Data

US 2012/0011521 A1    Jan. 12, 2012

Related U.S. Application Data

(60) Provisional application No. 61/398,495, filed on Jun. 25, 2010.

(51) Int. Cl.
  *G06F 3/00* (2006.01)
  *G06F 9/54* (2006.01)
  *G06Q 50/00* (2012.01)

(52) U.S. Cl.
  CPC ........ *G06F 9/541* (2013.01); *G06F 9/54* (2013.01); *G06Q 50/01* (2013.01)

(58) Field of Classification Search
  CPC ............ G06F 9/54; G06F 9/547; G06F 9/541
  USPC .......................................... 719/328, 330, 329
  See application file for complete search history.

(56) References Cited

U.S. PATENT DOCUMENTS

| | | | |
|---|---|---|---|
| 7,213,249 B2 * | 5/2007 | Tung Loo et al. | 719/330 |
| 7,913,300 B1 * | 3/2011 | Flank et al. | 726/12 |
| 8,762,429 B1 * | 6/2014 | Reeves et al. | 707/812 |
| 2007/0011736 A1 * | 1/2007 | Kalibjian et al. | 726/14 |

OTHER PUBLICATIONS

Danny B. lange, Mobile agents with Java: The Aglet API, 1998.*

* cited by examiner

*Primary Examiner* — Lechi Truong
(74) *Attorney, Agent, or Firm* — Thrasher Associates

(57) ABSTRACT

The invention is a novel developer platform that facilitates software application development, by consolidating common programming tasks into independently usable functional objects. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72(b).

2 Claims, 2 Drawing Sheets

DEVELOPER PLATFORM

CROSS-REFERENCE TO RELATED APPLICATION—CLAIM OF PRIORITY

This Application is related to and claims priority U.S. Patent Application No. 61/398,495 entitled NOVEL DEVELOPER PLATFORM which was filed on Jun. 25, 2010, which names at least Daniel Knoodle as a common inventor.

TECHNICAL FIELD OF THE INVENTION

The present invention relates to Application Development commonly called "App Development," and more particularly to software programming tools that enable Developers of Apps to tie into Application Programming Interfaces ("APIs").

PROBLEM STATEMENT

Interpretation Considerations

This section describes the technical field in more detail, and discusses problems encountered in the technical field. This section does not describe prior art as defined for purposes of anticipation or obviousness under 35 U.S.C. section 102 or 35 U.S.C. section 103. Thus, nothing stated in the Problem Statement is to be construed as prior art.

Discussion

Apps are proliferating at unbelievably rapid rates, particularly since smart phones incorporated powerful processors and quality batteries. The advent of "App Stores" only quickened this pace. Soon thereafter everyone thought that "there's an app for that." However, this clever piece of marketing led to unintended consequences. First, people believed this message, and concluded that Apps must be amazingly simple to "build" (or program). Second, marketing departments and executives almost instantly felt ashamed and behind the curve. The first result is that literally hundreds of thousands of businesses and individuals (hereinafter just "businesses") with neat ideas sought out "App Development Shops" such as X-CUBED LABS®. The second result is that only then did these businesses learn of the chasm between App development marketing and reality, namely that App development is much more costly, difficult, and time consuming than the marketing messages led them to believe. The result is that the businesses either: 1) walked away frustrated, 2) put up the time and money to build the App they wanted, or 3) cut back on the type of App they wanted, and that their customers would enjoy. As a result of this, millions of Apps were downloaded with minimal "no frills" functionality—and then used only once or twice. This "App remorse" has even spun off one marketing campaign that asks, "Does your App suck?" Even industry followers such as GARTNER®'s Eric Knip have coined the phrase "Rich Context Aware" to differentiate Apps that meaningfully engage the end customer from those that are no-frills.

Accordingly, what is needed are system architectures, devices and methods (including business methods) for enabling developers to build Apps that meaningfully engage end customers faster and less expensively, the present invention provides such an invention.

BRIEF DESCRIPTION OF THE DRAWINGS

Various aspects of the invention, as well as an embodiment, are better understood by reference to the following detailed description. To better understand the invention, the detailed description should be read in conjunction with the drawings and tables, in which.

DETAILED DESCRIPTION OF THE INVENTION

Interpretation Considerations

Figure 1:
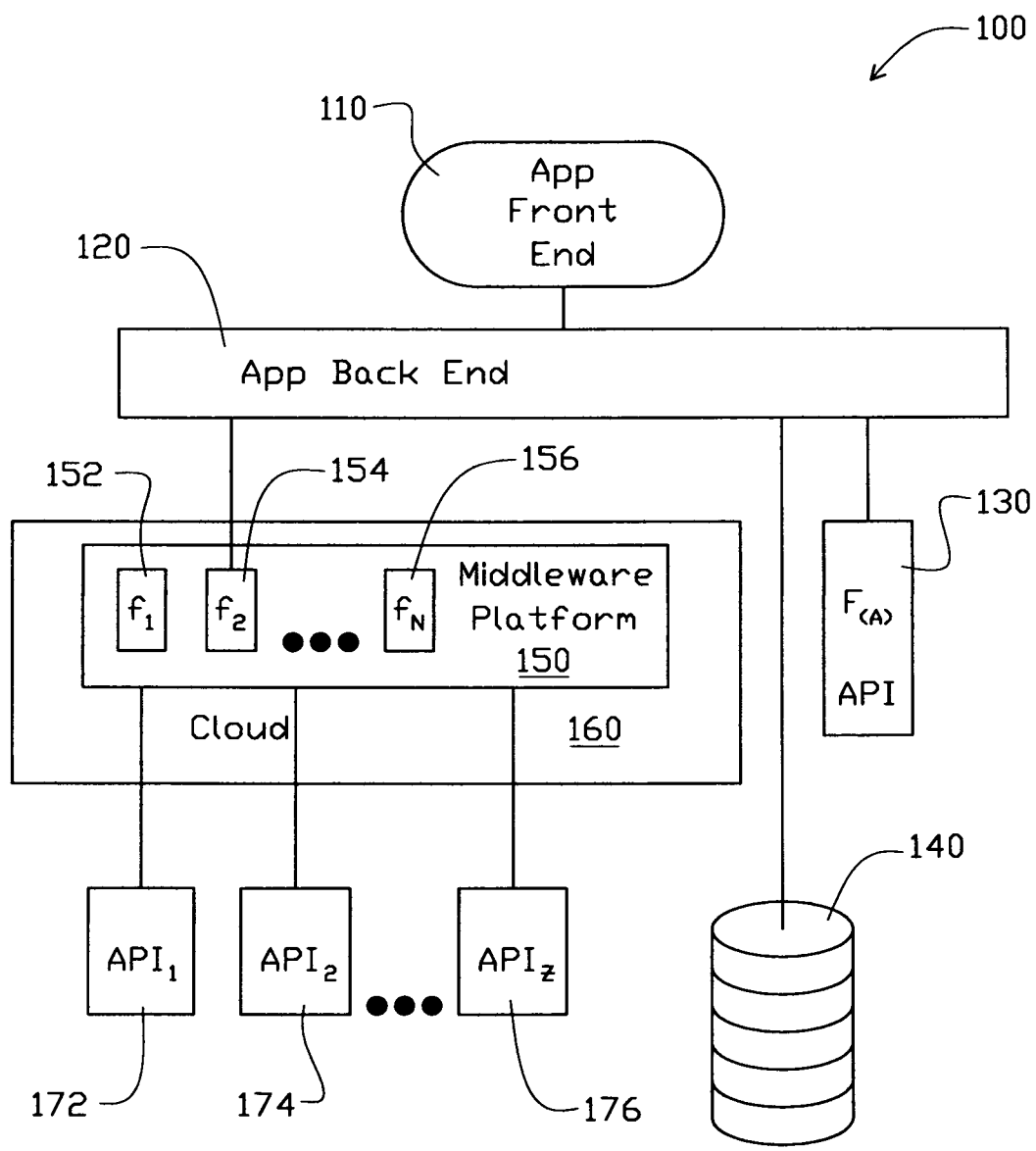
FIG. 1 illustrates one system architecture according to the invention.

When reading this section (which describes an exemplary embodiment of the best mode of the invention, hereinafter "exemplary embodiment"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts may be used to achieve the same results in exactly the same way, or to achieve the same results in a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act may be used to either achieve the same results in substantially the same way, or to achieve the same results in a not dissimilar way.

Accordingly, the discussion of a species (or a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the invention may arise. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (for example, one recognizes that "tacking" may be done by nailing, stapling, gluing, hot gunning, riveting, etc., and so a use of the word tacking invokes stapling, gluing, etc., and all other modes of that word and similar words, such as "attaching").

Fourth, unless explicitly stated otherwise, conjunctive words (such as "or", "and", "including", or "comprising" for example) should be interpreted in the inclusive, not the exclusive, sense. Fifth, the words "means" and "step" are provided to facilitate the reader's understanding of the invention and do not mean "means" or "step" as defined in §112, paragraph 6 of 35 U.S.C., unless used as "means for -functioning-" or "step for -functioning-" in the Claims section. Sixth, the invention is also described in view of the Festo decisions, and, in that regard, the claims and the invention incorporate equivalents known, unknown, foreseeable, and unforeseeable. Seventh, the language and each word used in the invention should be given the ordinary interpretation of the language and the word, unless indicated otherwise.

Additionally, some systems and methods of the invention may be practiced by placing the invention on a computer-readable medium, particularly control and detection/feedback methodologies. Computer-readable mediums include passive data storage, such as a random access memory (RAM) as well as semi-permanent data storage. In addition, the invention may be embodied in the RAM of a computer and effectively transform a standard computer into a new specific computing machine, including (and preferably) machines incorporating "cloud" computing system.

Data elements are organizations of data. One data element could be a simple electric signal placed on a data cable. One common and more sophisticated data element is called a packet. Other data elements could include packets with additional headers/footers/flags. Data signals comprise data, and are carried across transmission mediums and store and transport various data structures, and, thus, may be used to operate the methods of the invention. It should be noted in the following discussion that acts with like names are performed in like manners, unless otherwise stated. Of course, the foregoing discussions and definitions are provided for clarification purposes and are not limiting. Words and phrases are to be given their ordinary plain meaning unless indicated otherwise. The numerous innovative teachings of present application are described with particular reference to presently preferred embodiments.

GENERAL DESCRIPTION OF THE INVENTION

Automated Scalability

Scalability is the concept that a grouping of servers handles the load for the users of the applications in the system. The platform needs to be able to scale up and down dynamically based on usage and load, so that the system does not have huge load spikes taking over the service. Developers that build their application on the inventive platform will give their application the ability to scale automatically.

User Management

The user management functionality in one sense is a tool that a developer can use to give the end users of the application the ability to manage the preferences, interests from relationships and other user functionality.

User management functionality also includes control of preferences, account management, interests, relationships and status updates, invites, and whether to ignore, approve and/or delete relationships, among other user functionality.

Additionally, developers that develop applications on the inventive platform need to mange users of their applications. Developers need to mange those users preferences, those users settings and configurations. For example, if a user wants to get notifications to a cell phone, or email the their cell phone, and email details; at the same time the user has friends and other relationships to other individuals on that application, and those relationships between those individuals needs to be managed; the inventive enables this. Other examples of user management include friending relationships and un-friending, relationships between those individuals, ignores from one individual to the other, approvals in relationships and things of that nature known to those of skill in the art.

Activity Management Functionality

Developers want users to be able to interact with one another. Those interactions are done through activities. For example, if you have a sports activity for two individuals, and assume that they want to schedule something, such as an activity such as a racket ball game. For this or any sorts where they are going to come together at a specific location, at a particular times, and they are going to have a specific number of people that are going to come to that activity. Those people are going to have to be able to request invitations, and be sent invitations, for that activity. In addition, developers must manage different details about the users and their relationships with each other. For example, an activity may be based on the distance from one another, their friendship, relationships, or their geo-spatial relationship to one another, for example. Activities also take into account user preferences, and other user details. The inventive platform provides tool kits that enable developers to provide this feature set to the end users of that application. Additionally, activity management functionality includes managing invites, attendance, locations, events based on locations, distance, date, creator, friends, audio spatial, requests, indication, events and other data known to those of skill in the art, all surrounding a particular activity, for example.

Geo Location Functionality

One concept of the proprietary platform is location. Location aware information pulls the location data discussed above from desperate sources. Geo-coding is the concept of taking and address and encoding that address to a latitude and longitude point on the physical surface of the earth. Reverse geo-coding is the opposite—taking the latitude and longitude and turning it into a physical mailing address at some location. Geo IP (Internet Protocol) takes the user's IP address for their computer (the user's IP addresses can be used to identify their location). Exemplary geo location functionality includes geo coding, reverse field coding, geo IP, geo spatial, geo referencing, location, and points of interest.

Specifically, the IP address for that user can be traced back to an internet service provider and subsequently back to a location and point on the earth. Geo IP gives us the latitude and longitude of that user browsing through their web browser to a particular web sight or application.

Geo-spatial is the concept of a proximity area around some point. So, if a system knows a specific latitude and longitude point on the earth, Geo-spatial gives you the details about what's within a typical radius around that location.

Geo-fencing is semi related to Geo-spatial in that it is a literal spatial area of interest. Geo-fencing operates as a perimeter "drawn" around some location, for example, that wraps around a building or behind/surrounds a playground or a group of buildings. So, the fenced off area is a location grouping. As someone enters a fence their mobile device passes across the boundary of that fence, and the mobile device sends off some kind of signal. In one example, the signal is to a server somewhere on the proprietary platform that then allows the system to determine that this user just entered this area and that information can then be pushed out to other applications and other devices on the platform. For example, a program running on the platform may notify a user that a friend that as entered into that area—or a business partner, or an alumni, and things of this nature. So, that person, the user, is walking into that fenced off area, and sending off a notification.

Locations and Points of Interest

A point of interest is basically a listing of specific locations of a particular place or business. So, if one identifies all of the LA Fitness' in a geographic area, each one of those locations is point of interest. A point of interest can also be a park or somebody's landmark, such as somebody's home. Any kind of landmark, or a particular point, or business, or identifiable entity as it's marked on a physical map can be a point of interest. So as you are looking for information given a current point location where that user is standing with their hand held device, points of interest provide details about what is around that person, what are the businesses, and the restaurants, parks and the other points of interest that are around them.

Thus, the Geo-location functionality of the proprietary platform allows a developer to select which one or ones of these functionalities, or functionally categories that they want to employ on their applications.

The proprietary platform also matches that data back to a user's preferences in the context of the application that he/she is working in. For example, for an application that is specific to sports, then information related to restaurants is likely irrelevant and should be excluded.

Social Network Functionality

The social networks have proliferated in the past decade, and provide an wide assortment of interesting data through their APIs. The proprietary platform gives developers the ability for those application developers to provide social network functionality, avoiding the need to learn how to interface with each one of those social networks, learning the application programming interface and the building blocks and layers for each one of those individually. The proprietary platform consolidates the interfaces into one programming platform/interface, so that the application developers make one call to the platform and the platform makes the call then to Face book or Twitter, some other social network. The platform can simultaneously pull back all the relevant information for a particular query.

For social networks, the platform brings in details about a user's friends, their groups, relationships, and associations, among other data. The platform also allows for authentication, and single sign on (so when users come into the platform or into the platform's developers' applications, the developers don't have to manage and maintain users log-in credentials). The login credentials can be authenticated and validated through any of those social networks, Face book, Twitter, Linked-In, My Space, or any others. It off-loads the burden of user authentication and the authentication in the trust relationship management for the user to the application.

Trust management relationships of friend groups can be separated into friends, acquaintances, and professional associates, open to everybody or other peers of trust. Also a user can select which data is available, if any, to the platform or between friend groups, from whichever program or other platform that they are using or choosing to make available to your proprietary system. In one embodiment, the platform shares social relevant information, book marking pieces of information and then tagging those pieces of information.

Notification Functionality

Notification functionality is provided to developers so that then can allow their applications' users to notify each other or the system can notify users about various events and other things.

As activities occur as users invite someone to an activity, as users interact with other friends, groups, relationships they have an interaction on the platform. Various types of notifications are sent for those events. The notifications that the platform sends and receives are typically email-based, so the platform sends email notifications to the users in cases where we the platform is verifying their email address(es). In SMS (Simple Message System), which is how common everyday text messages are sent/received on a cell phone, the platform gives developers the ability to send text messages to their users, and for users to send messages through the platform that come out as text messages to other users. In one embodiment, we provide a multi-media messaging system that can be used for sending graphical content, video, images, and things of that nature, to a mobile device. iPhone provides a "push" ability as a proprietary system from Apple so that a developer can send push notifications to an iPhone directly. The platform can do this, also. Within the notifications, the platform can send a status up-date to friends. The messaging can be sent either from the application level, platform level, or from an individual level.

Accomplishment Sharing Functionality

Accomplishment sharing comes into play where there is a competition between users. This allows a developer to store who won a particular competition or sporting event or activity. Then an application can compare and rank those users based on those accomplishments, and based on their comparison to other users on that application platform. Users can accomplish tasks or gain some type of medal or award of some sort based on some accomplishment. So, if a user has visited "these four cities" they can get an accomplishment badge related to the visits. Other applications may use that functionality to determine how many Starbucks a user had, and compare this to other users of the application. Then, the user may get a coupon if they visit a restaurant frequently. This encourages users to check in every time they are at the restaurant, and incentivizes businesses/locations to provide "accomplishments" to users for having registered a visit a certain number of times. The businesses/locations can then use that data to turn offer discounts, for example.

Data Market Place

The data market place is for sharing user profile information between applications, developers, advertisers, and marketers. As a developer builds an application on the platform they build up a specific set of data around the users of that platform, including their preferences, their friends and their networks. So, that data can be licensed by other application developers, or marketers and advertisers to utilize that information to target users or enhance the experience of those users on other applications. It also can be used to predict applications that may be needed but have yet-to-be developed. It can also be used to predict user's habits and preferences, things of that nature and even having location sharing. In one embodiment, it contemplates the sharing of user location data between applications so those users' location preferences even can be shared across applications.

So, when a developer starts out with the platform, they begin with base functionalities that the platform provides for them to build out an application. They start with things like user authentication into that application, so they are going to build up some code on their end so they can facilitate communication with the device and the platform.

From there the developer may move to user profile development, user preferences, user details, things of that nature and get into perhaps locations for that user, their home address, work address, for example, to build up the location type data for that user. Next, a developer can build-out some event management functionality for their application. Next, a developer can develop functionality around some type of social information or specific activity types. For example, this could be implemented in an application for bar hopping. A user could select their bar, they could select the people they prefer to bar hop with, and if they met some sleazy guy on those bars they could make some note to the effect of "Don't go to bar x because there's some sleazy guy that hangs out there."

Conceivably, there could be facial recognition software so that the platform could use a picture, perhaps taken with an iPhone, to identify that "sleazy dude." And, then if Mr. Sleazy is identified in another photograph in another bar, Mr. Sleazy is recognition followed.

So, from the activity and event management, a developer starts to build a geo-location profile for an application. The user's geo spatial data and geo fencing starts to get built up and comes into play regarding the areas where there users are going frequently, fro example. User want to know what the things are that are around them—things that they can interact with that are related to their application(s). For example, in a bar application, perhaps they want to get some food, restaurant information, point of interest data, or the like; this lets the developer(s) of the application easily provide the functionality. Specifically, if a user goes to a bar, that bar could detect that they are present at their location and spontaneously make a menu available to them. They could also offer the user VIP services or offer them any other type of offer that that location might have available for users of this application to users of "that type." Perhaps it suggests playing pool if pool tables are not occupied.

If a user is open to sharing data, the bar could send/receive information about the user's likes, dislikes and habits. So, perhaps that user likes Shirley Temples so they are offered a discount on Shirley Temples, or Stella on tap but not Stella in a bottle. In other words, a user can begin an experience with an application with a context that enhances the user experience.

At the same time, notifications are going out to the system so that the system registers each user at that location. The bar/restaurant/location may register that the user has entered the building, and they can start the whole sequence of offering things and catering to that individual user. Developers can also control how they want to limit their cost for a user, so that they can limit the amount of information going back and forth, or they limit the number of SMS or internet messages, or other information, are going back and forth to limit their cost (based on any factor). This is a cost containment feature for the developer.

Also, as the inventive platform scales up and down for the user-load, a developer may want max limit how much they want to get charged for user load on the system so they scale things like that and set the preferences so there not incurring charges that they wouldn't expect. The application management interface allows them to access billing information, and access all these settings and configurations for that application. In one embodiment, there's a mail server the platform interfaces with, and that configuration for that mail server and the log-in credentials are provided when they tie into geo-location data they can either utilize the 's log-in credentials for that geo-location information, and utilize the 's billing plan, or they can choose to get billed separately from that geo-location provider so that they can pawn that information from the other provider and pay them directly.

Email server enables the platform to tie into the developer's email server. So, the email address that an email is sent from shows up as an application, or a company that is making that application, so that the whole application is being branded as a particular company or trade name rather than being identified as the actual data-source, so that the entity underwriting an application can use the in a manner consistent with marketing and branding strategies. Via application management, a developer can manage meta data and the details about what's being stored for their users, and the types of information being stored for the users. In this light, a data market place is created, so that developers and/or the platform can re-sell, share and license that information between applications and developers and companies/entities.

Shared Context

The goal of shared context is to intelligently match a need, want, or desire expressed by an individual user to the resources (person, substance, knowledge, or other container of value) made available by members of their social graph (explicitly trusted) or members of an application at large (implicitly trusted).

Shared context is needed because as the user-base of networks such as Twitter climbs, and the number of social graph connections increases between users, an alarmingly disproportionate amount of status updates deemed irrelevant by each user ("noise") obscures items of genuine interest ("signal"). Noise damages user perceptions of a network's utility, which in turn threatens the long-term viability of that network, such as MySpace is experiencing. The system facilitates intelligent social messaging queuing. Most users have tangible objectives in mind when they approach social media. They inherently want to share their knowledge, experiences, and skills with people interested in what they have to say. Likewise, they wish to receive only messages they personally consider valuable that meet their own needs, interests, and tastes.

The system facilitates shared context by seamlessly distributing messages to dynamically-aggregated audiences (microcosms within a social graph that share a common bond meeting the objective of the need in question) that would deem that message relevant to themselves at a personal level. Components would include an automated relevance filter seeking obvious connections that are easily identifiable, and a human-centered curation process to validate connections being proposed.

The sources of shared context are any type of content produced by an individual that can be reduced to unstructured text (whether embedded in the content itself or available as associated metadata) for direct analysis by the Shared Context system and ability to associate metadata to the content via crowd-sourced or trusted human input into the Curation (meaning that users of a site could look at a picture of a yellow parrot, and associate "bird", "parrot", "yellow", and "beak" as meta data associated with the image). In addition, users may provide information about themselves through applications designed to format responses in a way that is inherently understandable to the Shared Context system, removing the need for unstructured text analysis.

A user initiates the process of sharing context by opting-in to pushing their data into the system by a) linking their social accounts, and b) providing direct information to questions on tastes and behaviors in order to build an online persona within the system that matches their real-world persona as closely as possible. The user sets privacy controls on who can be considered as a potential match only within a certain network, such as FaceBook friends, or perhaps a subset of a network, like FaceBook friends who live in Dallas.

The system pre-qualifies potentially valuable connections between users that are a) connected tangentially or b) unconnected to one another: as the system builds more profiles on members of a user's social graph, it is better able to facilitate the propagation of shared context. When two users provide the same or similar response to a given question or scenario ("what's your favorite sports?"), then the system is able to pre-qualify a connection. Different types of data with different similarities between users will allow messages to be ranked from most potentially relevant to least potentially relevant (meaning that someone who shares the same tastes and geo-location of a user might be better able to answer their question on a given subject in a certain nearby location).

The container of shared context is any type of social media content (tweet, audio clip, video clip, image) that is found to match the profiles of two users within pre-defined trust networks. The platform can pass the message from the sender (one with an objective) to vetted recipients (one or more users who could directly or indirectly meet the sender's objective). Icon/Drag-and-Drop/Pull-Down Programming In one embodiment the system allows for a developer/designer to choose an icon or other indicia to designate a functionality to apply to a program/application. For example, a developer/designer may select a social media functionality (as discussed above) to provide pre-designated functions to the developer's application. When a limited set of functionalities are provided, these may be selected by a developer in a "drop-down" menu format. Accordingly, a potential user may become a potential developer/designer whereby they can select from a variety of functions, and also assign a number of indicias, such as a cub scout troop number, to identify activates and functions associated with that troop. Ultimately, one with no developer, designer, or coding experience may generate a unique application.

For example, perhaps a Den Mom wants to create an application for her son's Cub Scout Troop. She may open up the system, and first select an icon associated with "create a closed social network." Next, she will select from a pull-down menu "administrator approved acceptance only" so that she, or another application administrator, can control who joins the application's network. She may choose to provide for two categories of members via a pull down menu, and then name one group "Scouts" and another group "Parents" via standard data entry. Then, she may select an icon associated with "create geo-location ability" so that "members" can see where each other are when they are using the application. Next, she may add SMS text messaging capabilities by selecting an "enable messaging" icon for each group type. She may also choose to enable broadcast text messaging via a "enable broadcast messaging," in this case, just for the group called Parents. Then, by selecting a "create profile type" icon, the Den Mom determines via radio buttons the types of information each user of the app should either provide, or import from another source (in which case the mom would use a "social networking" icon to create interfaces with respective popular social networks). Now, the mom can upload images, including an "app image", and associate it with the application she just created. Now, the Den mom can use templates to generate the form for user data entry. Other functions can be added and customized, as well as web and native code enablement, in a similar manner. Finally, the application is submitted to application distributors, such as Apple, for approval and distribution.

DESCRIPTION OF THE DRAWINGS

FIG. 1 illustrates one system architecture ("architecture") 100 according to the invention. The architecture generally comprises an App having an App front end ("front end") 110 and an App back end ("back end") 120. Although only one App is shown, it should be understood that the inventive middleware platform can service and support any number of Apps. The front end 110 is known in the App Design and App Developments arts and generally comprises a user interface, and manages what the user sees and perhaps interacts with on a smart phone screen or in some cases a desktop computer screen. The back end 120 is also generally known in the same arts and generally comprises the code needed to access functions and information (some of which were discussed above) from APIs. For example, one function ("F(a)") that could be accessed by an API could be a regulated poker shuffle provided by an independent API 130. A back end 120 will sometimes access and store data independently using their own preferred data storage systems, illustrated here as a database 140.

In invention includes cloud computing, which practically eliminates the need to plan to scale a database or hardware on an Apps's back-end, as a cloud computing layer ("cloud") 160, such as MICROSOFT®'s AZURE® database. Additionally, a middleware platform layer ("middleware platform") 150 sits on top of the cloud 160.

The middleware platform 150 is a back-end facing API, such as a REST (or "restful") API, that provides distinct advantages for an App Developer. The middleware platform 150 allows App developers to access desired app functions 152, 154, 156 where N is the number of App functions available through the middleware platform. These App functions are made available to developers by the middleware layer separately and independently accessing that information from third-party APIs. In other words, the developer only needs to access one API (the middleware platform 150) rather than develop code into multiple end-point APIs 172, 174, and 176 where Z is the number of end-point APIs the middleware platform 150 ties into. Further, this shifts the burden of maintaining the tie-in into the end-point APIs 172-176 on the middleware platform 150 rather than on the developer of the App back end 120 or its owner.

Additionally, in a preferred embodiment, the middleware platform 150 not only ties into the end point APIs 172-176, it also cross-integrates the data that is obtained from these APIs, and normalizes the way in which the data or functions obtained from the end point APIs 172-176 is presented to the back end developer in a simplified conceptual methodology via the middleware platform 150 API. Of course, it will be appreciated that some endpoint features may be written directly into the middleware platform 150 and not access a third-party API at all without departing from the scope or understanding of the invention.

Figure 2:
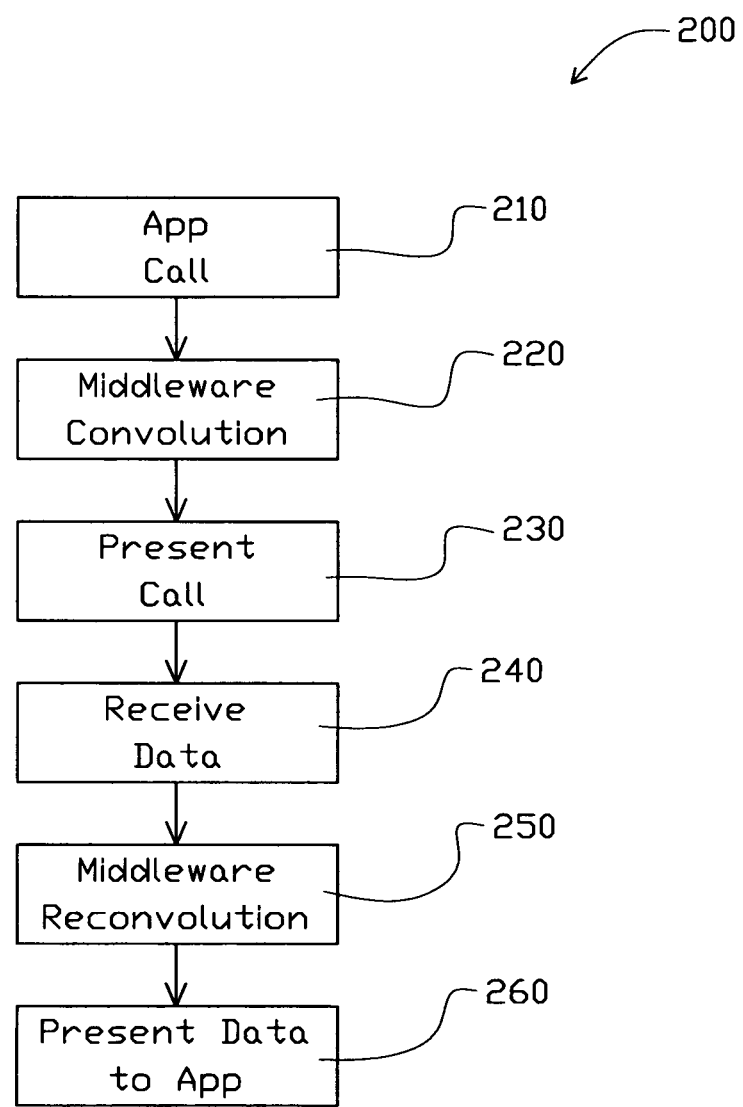
FIG. 2 is a flow chart of a process for providing an endpoint third-party API data or function through a middleware platform API to an App.

FIG. 2 is a flow chart of a process algorithm 200 for providing an end-point third-party API data or function through a middleware platform API to an App. Although this data request is illustrated as to a call, it will be appreciated by those of ordinary skill in the art upon reading this specification that this process can be applied to analogous App functions. The algorithm starts in a App Call act 210, in which a middleware platform such as the middleware platform 150 receives a request for a particular piece of data, such as the location of a business. Then, in a middleware convolution act 220, the middleware layer performs a number of acts directed to the App Call act 210. For one, the middleware layer takes advantage of data previously stored on a cloud (such as the cloud 160)—for example an authentication token or security details. Then, the middleware layer uses the information provided in the call to construct a properly formatted call for a third-party API data provider, such as GOOGLE MAPS®. Next, in a present call act 230, the middleware platform makes call to the third party API (or more precisely, the proper API endpoint), which may be using a restful or SOAP standard. Although not illustrated, if an error message is received, it is treated in a manner similar to receiving data, discussed next.

Properly formatted data is received responsive to the call in a receive data act 240; continuing with our example, the location of a business. Then, in a middleware reconvolution act 250, the data is disambiguated to match the format the App expects, as per our example, the data associated with the location of the business. Additionally, the data may be stored for later use and retrieval by the middleware platform as provided by each end point API's terms of service or equivalent license. Further, the middleware reconvolution act 250 may also incorporate other data stored on the cloud, and may also "strip out" certain data provided by the end point API prior to presenting the data to the App in a present data to app act 260.

Though the invention has been described with respect to specific preferred embodiments, many variations and modifications will become apparent to those skilled in the art upon reading the present application. Specifically, the invention may be altered in ways readily apparent to those of ordinary skill in the art upon reading the present disclosure. It is therefore the intention that the appended claims and their equivalents be interpreted as broadly as possible in view of the prior art to include all such variations and modifications.

I claim:

1. A method for providing an end-point third-party API data or function through a middleware platform API to an App, the method comprising acts of:

receiving a request for a data from an App residing in a memory on a mobile device at a middleware platform API; the App associated with at least a first third-party API and a second third-party API, where the first third-party API provides messaging data, and the second API provides social network data;

convoluting the data by incorporating a previously stored authentication token, and using information provided in the request to construct a properly formatted call for the second third-party API;

generating and sending a request for a data set to the second third party API;

receiving a data set not from a local hardware source responsive to the request sent to the second third party API, the data set comprising social network data;

reconvoluting the data set by automatically selecting predetermined data from the data set, and disambiguating the data returned for the App such that at least the data requested by the App can be provided to the App; and presenting the data to the App;

storing any of the data in the data set; and striping out certain data provided by the end point API prior to presenting the data to the App.

2. The method of claim 1 further comprising incorporating other data stored at a direction of the middleware platform.

* * * * *